United States Patent
Matsuki et al.

(10) Patent No.: US 6,307,084 B1
(45) Date of Patent: Oct. 23, 2001

(54) CONTACT LOCATION DETECTING MECHANISM OF TOUCH SIGNAL PROBE

(75) Inventors: Kaoru Matsuki; Kiyokazu Okamoto; Kazuhiko Hidaka, all of Tsukuba (JP)

(73) Assignee: Mitutoyo Corporation, Kanagawa-ken (JP)

( * ) Notice: Subject to any disclaimer, the term of this patent is extended or adjusted under 35 U.S.C. 154(b) by 0 days.

(21) Appl. No.: 09/477,948

(22) Filed: Jan. 5, 2000

(30) Foreign Application Priority Data

Jan. 6, 1999 (JP) .................................................. 11-001097

(51) Int. Cl.[7] .................................................. G01B 7/012
(52) U.S. Cl. .................................. 558/58; 33/561; 33/503
(58) Field of Search .......................... 33/558, 556, 559, 33/561, 503, 549, 550, 551, 553, 554, 555

(56) References Cited

U.S. PATENT DOCUMENTS

| | | | |
|---|---|---|---|
| 3,823,482 | * | 7/1974 | Schiler .................................... 33/549 |
| 4,246,795 | * | 1/1981 | Sigg et al. ............................... 33/651 |
| 4,294,121 | * | 10/1981 | Inoue ...................................... 73/662 |
| 4,397,188 | * | 8/1983 | Bansevichus et al. .................. 33/561 |
| 5,247,751 | * | 9/1993 | Ohya et al. .............................. 33/558 |
| 6,044,569 | * | 4/2000 | Ogihara et al. ......................... 33/556 |

FOREIGN PATENT DOCUMENTS

| | | |
|---|---|---|
| 6221806 | 8/1994 | (JP) . |
| 7198364 | 1/1995 | (JP) . |

* cited by examiner

*Primary Examiner*—Christopher W. Fulton
(74) *Attorney, Agent, or Firm*—Webb Ziesenheim Logsdon Orkin & Hanson, P.C.

(57) ABSTRACT

A contact location detecting mechanism (1) of a touch signal probe (10) includes a rotary motion generator (30) for scanningly moving a stylus (102) on a plane (A), a phase value detector (50) for detecting a phase value (θ) indicating a rotation position of the scanning rotary motion, and a contact location detector (70) for detecting a contact location of a contact portion (102A) based on a detection signal value (V) detected by the detector (103B) and the phase value (θ). Since the contact location of the contact portion (102A) can be detected by the contact location detector (70), the touch signal probe (10) can be used for a profiling measurement and continuous measurement of a workpiece.

7 Claims, 10 Drawing Sheets

CONTACT LOCATION DETECTING MECHANISM OF TOUCH SIGNAL PROBE

BACKGROUND OF THE INVENTION

1. Field of the Invention

The present invention relates to a touch signal probe for measuring a surface position of a workpiece by contact, especially a vibrating touch signal probe for detecting vibration change caused when a contact portion of a stylus touches the workpiece. More specifically, it relates to a contact portion detecting mechanism of a vibrating touch signal probe for detecting a contact location of the contact portion against the workpiece.

2. Description of the Related Art

A height gauge (linear measuring machine), a coordinate measuring machine and a profile measuring machine are known as a measuring machine for measuring the configuration and dimensions of a workpiece. Various probes are used in the measuring machine for detecting the positional relationship of a measuring machine body and the workpiece. The probes can be grouped into a non-contact probe and a contact probe, or alternatively, a continuous measuring probe and a touch trigger probe.

Figure 10:
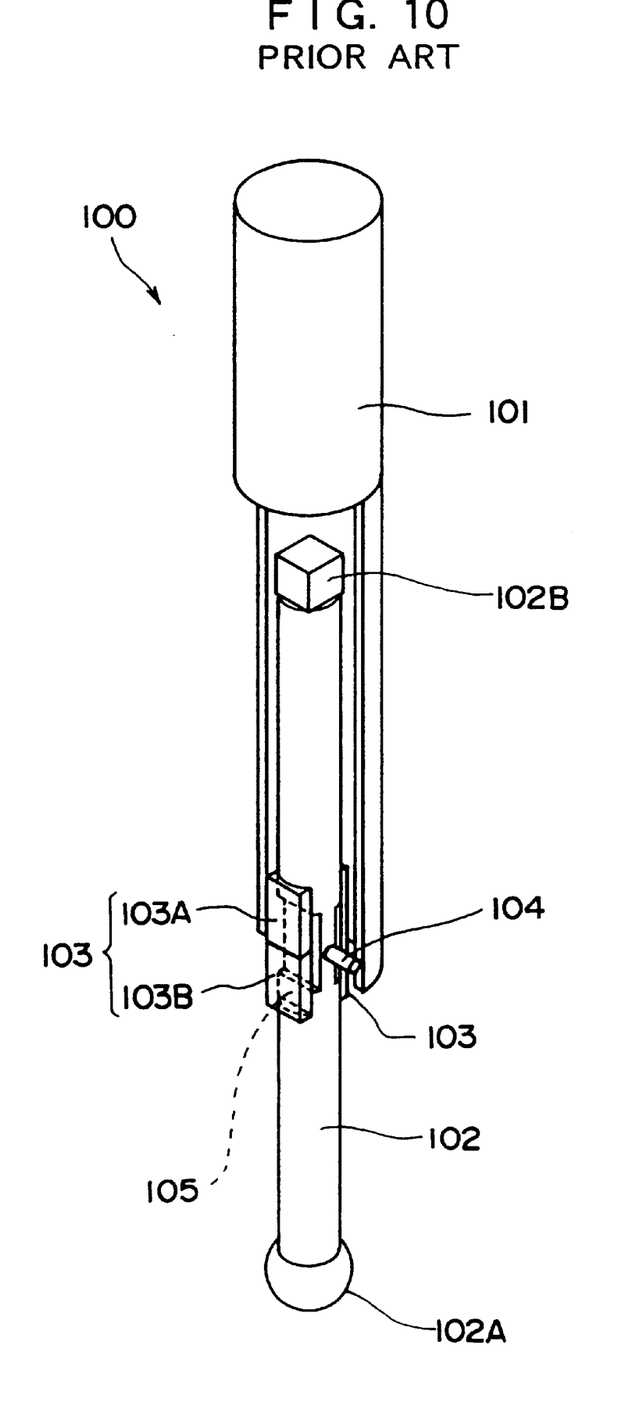
FIG. 10 is a perspective view for showing a conventional touch signal probe.

An ultrasonic touch trigger probe disclosed in Japanese Patent Laid-Open Publication No. Hei 6-221806 is known as a contact touch trigger probe for the above coordinates measuring machine. As shown in FIG. 10, the touch signal probe 100 includes a stylus holder 101, a stylus 102 and a piezoelectric element 103. The stylus holder 101 is mounted to a stylus support moving in a three-dimensional space at a predetermined velocity vector in accordance with an external command (not shown). The stylus moves along with the stylus support and detects the contact against the workpiece, so that an edge position of the workpiece is detected by reading the coordinate in contact.

The stylus holder 101 is shaped into a tubular cylinder, and the stylus 102 is supported at the inner lower end thereof by a pair of engage pins 104 provided on a support point at an approximate axial center of the stylus 102. A contact portion 102A having a spherical surface to be abutted to the workpiece in measurement is attached to a lower end of the stylus 102 and a counter balance 102B having the same weight as the contact portion 102A is mounted to an upper end of the stylus 102, so that the support point of the stylus holder 101 is consistent with a centroid of the stylus 102.

A pair of grooves 105 as a attachment portion of the piezoelectric element 103 are cut on an outer circumference of the stylus 102 and two piezoelectric elements 103 having the same configuration are attached to the grooves 105 by an adhesive or the like with both ends being firmly adhered.

The piezoelectric elements 103 are disposed approximately symmetrically along an axial direction of the stylus 102 with the support point of the stylus 102 at the center thereof, the piezoelectric elements being divided into a vibrator 103A for resonantly vibrating the stylus 102 and a detector 103B for detecting a change in vibration of the stylus 102.

The touch signal probe 100 vibrates the stylus 102 along an axial direction thereof by the vibrator 103A. When the ball-shaped contact portion 102A touches the workpiece, vibration of the stylus 102 is restricted by a contact force to change vibration status. Accordingly, edge position etc. can be detected by detecting the change in the vibration status by the detector 103B.

However, since the change in the vibration status of the stylus 102 differs according to a difference in contact location (the part of the surface of the ball-shaped contact portion 102A actually touching the workpiece) of the contact portion 102A against the workpiece and deflection by the contact force of the contact portion 102A, the touch signal probe 100 having the above-described arrangement is not suitable for a probe for conducting profiling measurement and continuous measurement where various parts of the contact portion 102A touches the workpiece.

Figure 11A:
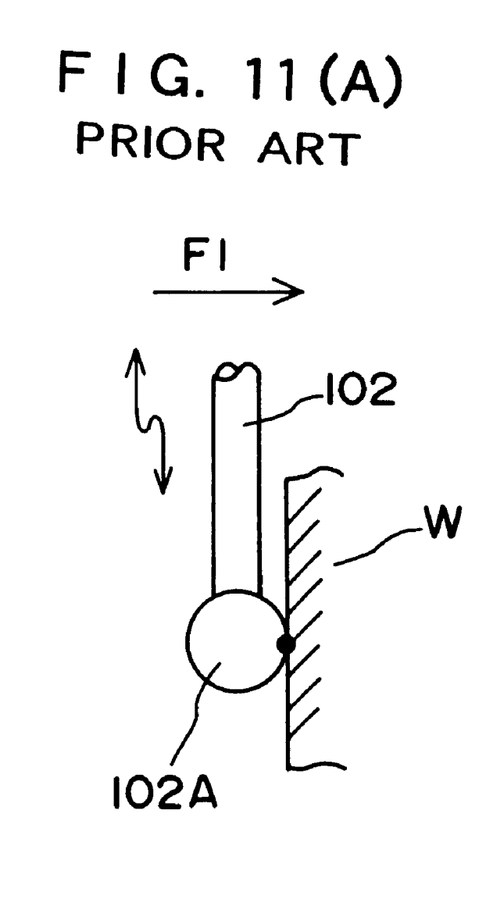
FIG. 11(A) and FIG. 11(B) are schematic views for showing problem of a conventional touch signal probe.

Specifically, as shown in FIG. 11(A), when the contact portion 102A touches the workpiece W in a direction orthogonal with the axial direction (vibrating direction) of the stylus 102, the vibration status along the axial direction of the stylus 102 does not largely change even when the deflection against the workpiece W by a contact force F1 of the contact portion 102A increases.

Figure 11B:
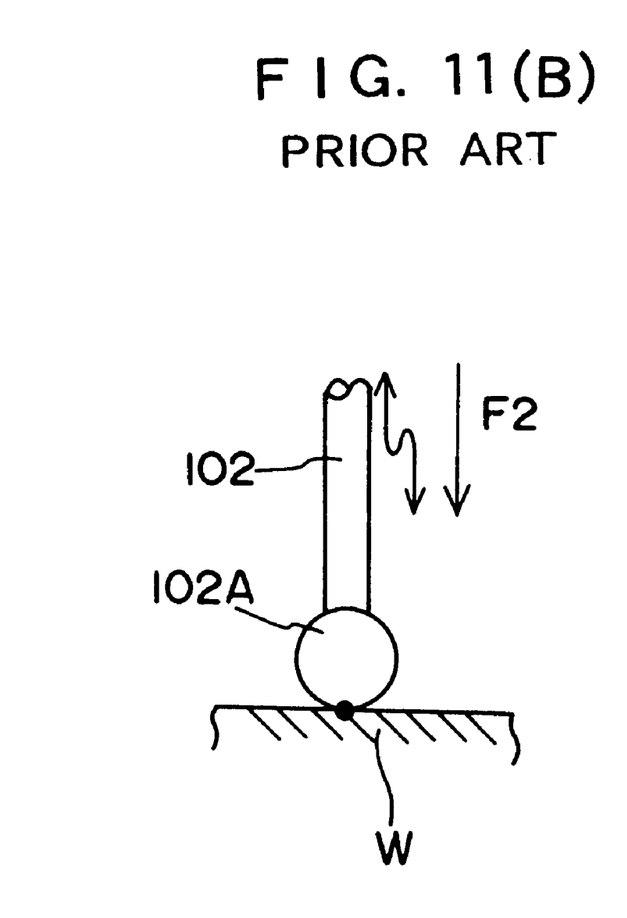
Figure 12:
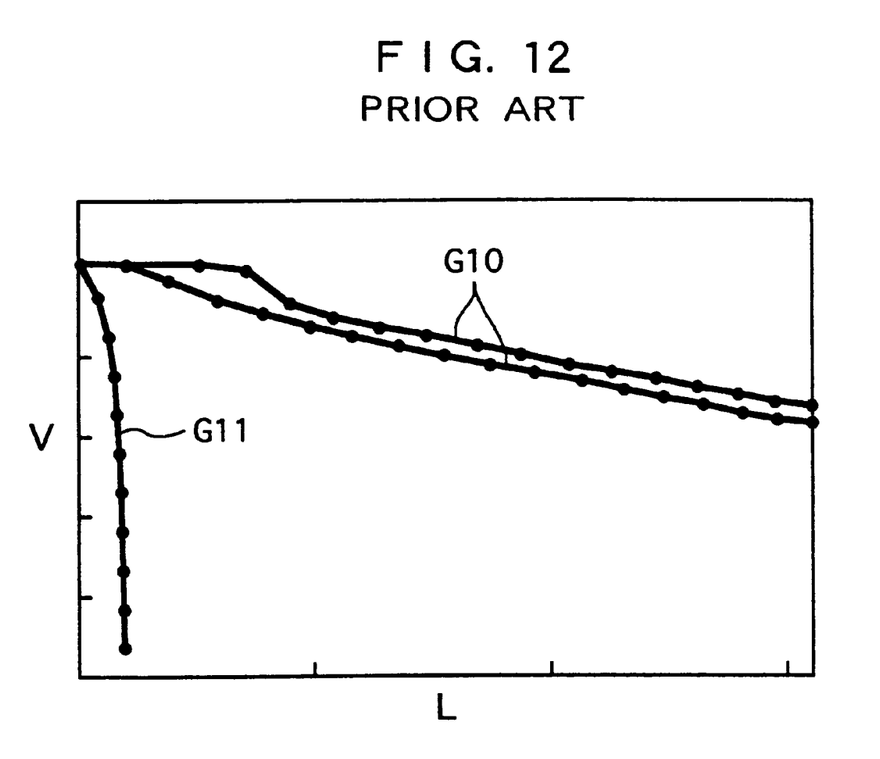
FIG. 12 is a graph for showing a relationship between a detection signal and the deflection of the conventional touch signal probe shown in FIG. 11(A) and FIG. 11(B).

On the contrary, as shown in FIG. 11(B), when the contact portion 102A touches the workpiece W along the axial direction of the stylus 102, the vibration status of the stylus 102 largely changes even when the deflection toward the workpiece W by contact force F2 of the contact portion 102A changes only slightly. The status is shown in FIG. 12, where a detection signal V showing vibration status change of the stylus 102 changes gently relative to a change in deflection L as shown in graph G10. On the other hand, the detection signal V largely changes even against a small change of the deflection L.

Accordingly, when the touch signal probe 100 is moved together with the stylus support in a three-dimensional direction to conduct profiling measurement for measuring the configuration of the workpiece W, since the change in vibration status of the stylus 102 largely differs according to the contact location of the contact portion 102A, non-ambiguous determination of the edge of the workpiece W is difficult according to magnitude of the vibration status change of the stylus 102. Therefore, such ultrasonic touch signal probe 100 is not suitable as a probe for profiling measurement and continuous measurement of the workpiece W. Further, when the size of the probe is reduced, the rigidity of the stylus is reduced. Accordingly, axial resonance of the stylus cannot be maintained in the continuous measurement, thus resulting in decrease in sensitivity, i.e. deterioration in accuracy.

SUMMARY OF THE INVENTION

An object of the present invention is to provide a contact location detecting mechanism for the above ultrasonic touch signal probe to be used for profiling measurement and continuous measurement for measuring configuration of the workpiece, which is capable of measuring a configuration of the workpiece with high accuracy.

A contact location detecting mechanism according to the present invention is for a touch signal probe having a stylus support for moving in a three-dimensional space by a predetermined velocity vector according to an external command, a stylus holder mechanically connected to the stylus support, a stylus supported by the stylus holder and including a contact portion to be touched to a workpiece at a pointed end thereof, a vibrator provided to a part of the stylus holder for resonantly vibrating the stylus in an axial direction thereof, and a detector provided to a part of the stylus holder for detecting a change in vibration by the vibrator, the touch signal probe detecting the change in vibration by the detector when the contact portion touches the workpiece, the contact detecting mechanism of a touch signal probe detecting the contact location on the contact portion to the workpiece. The contact detecting mechanism includes: a rotary motion generator for making a scanning rotary motion of the stylus on a plane orthogonal with an axis of the stylus by a predetermined radius and a predetermined angular velocity; a phase value detector for detecting phase value indicating a rotation position of the scanning rotary motion by the rotary motion generator; and a contact location detector for detecting the contact location of the contact portion to the workpiece based on a detection signal value detected by the detector and the phase value detected by the phase value detector while the contact portion touches the workpiece.

The rotary motion generator may include a driving mechanism for moving the stylus on a plane orthogonal with an axis of the stylus in X-axis and Y-axis direction orthogonal with each other, and a rotation controller for giving a control signal of X=R cos θ and Y=R sin θ relative to a locus of the rotary motion having a radius R and a rotary angle θ.

The phase value detector may preferably obtain a rotary angle θ based on a control signal outputted by the rotation controller.

According to the present invention, since the rotary motion generator, the phase value detector and the contact location detector are provided, the contact location of the contact portion against the workpiece can be obtained as follows.

First, the rotary motion generator generates the scanning rotary motion of the stylus on a plane orthogonal with a vibrating direction of the stylus while the contact position of the stylus touches the end portion of the workpiece. Subsequently, the change in vibration status of the stylus detected by the detector during the scanning rotary motion is detected as a detection signal value and the phase value of the rotary motion at this time is detected by the phase value detector. The contact location of the contact portion against the workpiece is detected by the contact location detector based on the detected detection signal value and the phase value.

Accordingly, the contact location of the contact portion can be detected by an ultrasonic touch signal probe and the shape of the workpiece can be measured with high-accuracy by detecting the contact portion, thus capable of using the touch signal probe as a probe for profiling measurement and continuous measurement for measuring a configuration of the workpiece.

The contact location detecting mechanism of a touch signal probe according to the present invention may preferably arranged so that the contact portion has a spherical surface; that the contact location is defined as a point on the spherical surface and is given by a longitude position defined as an angular position on the plane orthogonal with the axis of the stylus and a latitude position defined as an angular position on a plane including the axis of the stylus; and that the contact location detector obtains the longitude position from the phase value at which a change of the detection signal value is maximum while the contact portion touches the workpiece during the scanning rotary motion, and obtains the latitude position from the phase value having the maximum change of the detection signal value and a phase section width indicating a section of the phase value within which the detection signal value varies by the contact.

More specifically, the longitude position and the latitude position can be obtained according to the following steps.

Figure 1:
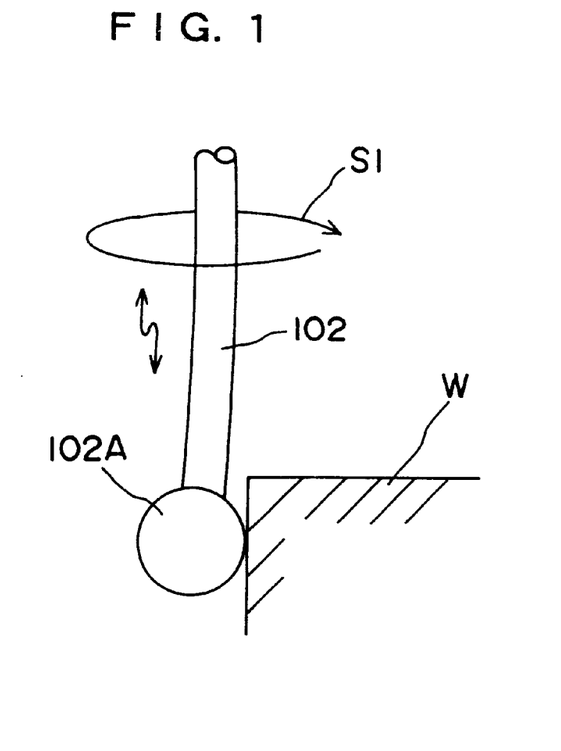
FIG. 1 is a schematic view showing contact status of a contact portion of a stylus and a workpiece for showing a function of the present invention.

As shown in a vertical cross section of FIG. 1, scanning rotary motion of the stylus 102 is generated by the rotary motion generator around an edge of a workpiece W and the contact portion 102A touches the workpiece W on a part of an orbit S1 of the scanning rotary motion.

(1) Detection of Longitude Position

Figure 2A:
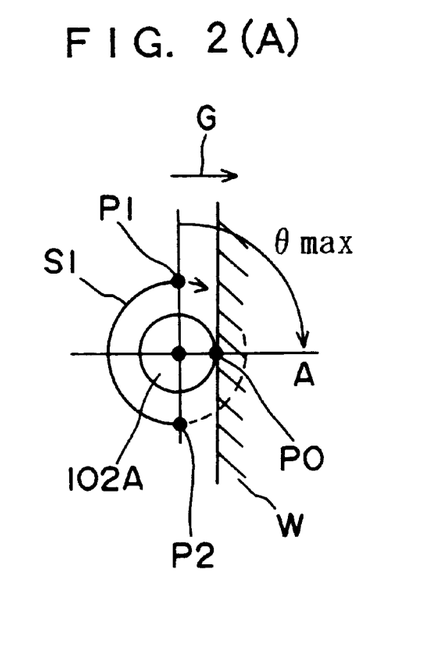
FIG. 2A and FIG. 2B are schematic views showing contact status of a contact portion of a stylus and a workpiece for showing a function of the present invention.
Figure 2B:
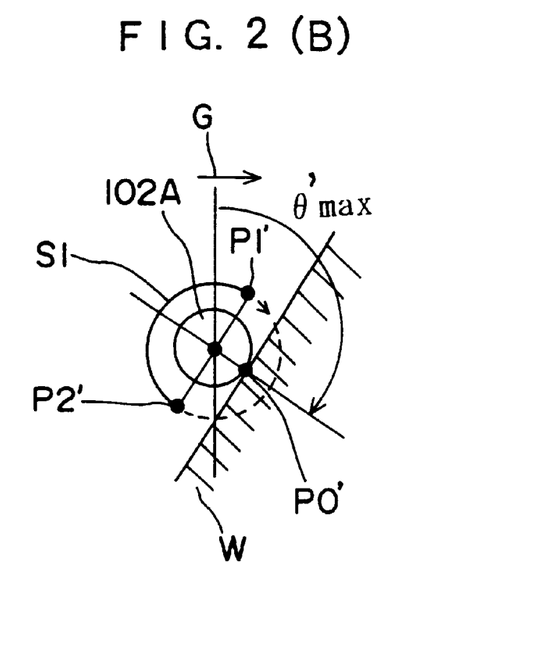

Two cases of the contact status of the contact portion 102A and the workpiece W shown in FIG. 1 are supposed, where an edge surface of the workpiece W is orthogonal with an advancement direction G of the contact portion 102A as shown in FIG. 2(A) and where an edge surface of the workpiece W inclines relative to the advancement direction G of the contact portion 102A as shown in FIG. 2(B).

Figure 3:
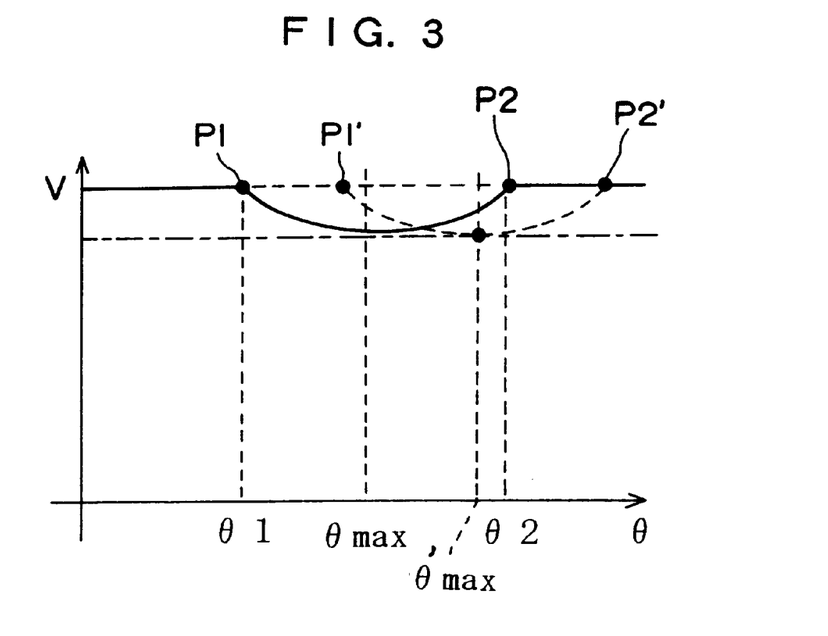
FIG. 3 is a graph for showing a function of the present invention.

When the edge surface of the workpiece W is orthogonal with the advancement direction G of the contact portion 102A as shown in FIG. 2(A), the planar position of the contact location of the contact portion 102A and the workpiece W is a point P0 along the advancement direction G. When the scanning rotary motion of the stylus 102 is generated by the rotary motion generator, a contact force is applied to the stylus 102 by the scanning rotary motion between a point P1 and a point P2, thereby restricting vibration of the stylus 102. Accordingly, as shown in FIG. 3, a detection signal value V becomes smaller between the point P1 and the point P2 (a phase value θ1 and θ2) as compared to non-contact status. And a change amount of the detection signal value V is the largest at the phase value θ max (a phase value orthogonal with an edge surface of the workpiece) at an approximate center of the phase value θ1 and the phase value θ2.

On the other hand, as shown in FIG. 2(B), when the edge surface of the workpiece W inclines relative to the advancement direction G of the contact portion 102A, the contact location of the contact portion 102A with the workpiece W is a point P0' inclined at a predetermined angle from the advancement direction G of the contact portion 102A on account of inclination of the edge surface. When the scanning rotary motion of the stylus 102 is generated, a delay is caused to a point P1' where the contact force begins to be applied and a point P2' where the contact force ends to be applied as compared to the case shown in FIG. 2(A), so that a delay is caused to the position showing maximum change amount of the detection signal value V. Accordingly, as shown in FIG. 3, a range of the point P1' and the point P2' (the phase value θ1' to θ2') causing change in the detection signal value V on account of the contact force causes delay as compared to the case shown in FIG. 2(A), resulting in a delay caused to a phase value θ max' having the maximum change amount of the detection signal value V.

A deviation between the phase value θ max and the phase value θ max' in the FIG. 3 shows an angular position, i.e. the longitude position, of the contact location of the contact portion 102A to the workpiece W on a plane orthogonal with an axis of the stylus 102, as can be seen from FIG. 2(A) and FIG. 2(B). Accordingly, respective longitude positions can be obtained and an inclination of the contact portion P0' of the contact portion 102A relative to an advancement direction G of the stylus 102 can be detected by detecting deviation amount of the phase value θ max' relative to the phase value θ max.

(2) Detection of Latitude Position

Next, calculation of the latitude position as a contact location of the contact portion 102A defined as an angular position on a plane including the axis of the stylus 102 will be described below.

Figure 4:
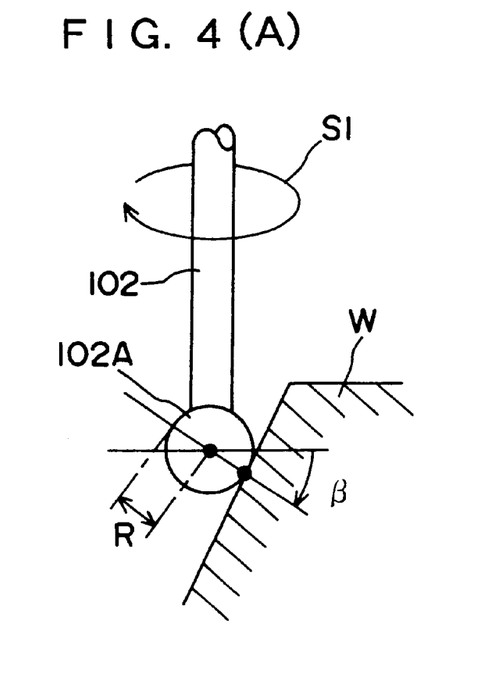
FIG. 4A and FIG. 4B are schematic views showing contact status of a contact portion of a stylus and a workpiece for showing a function of the present invention.
Figure 5:
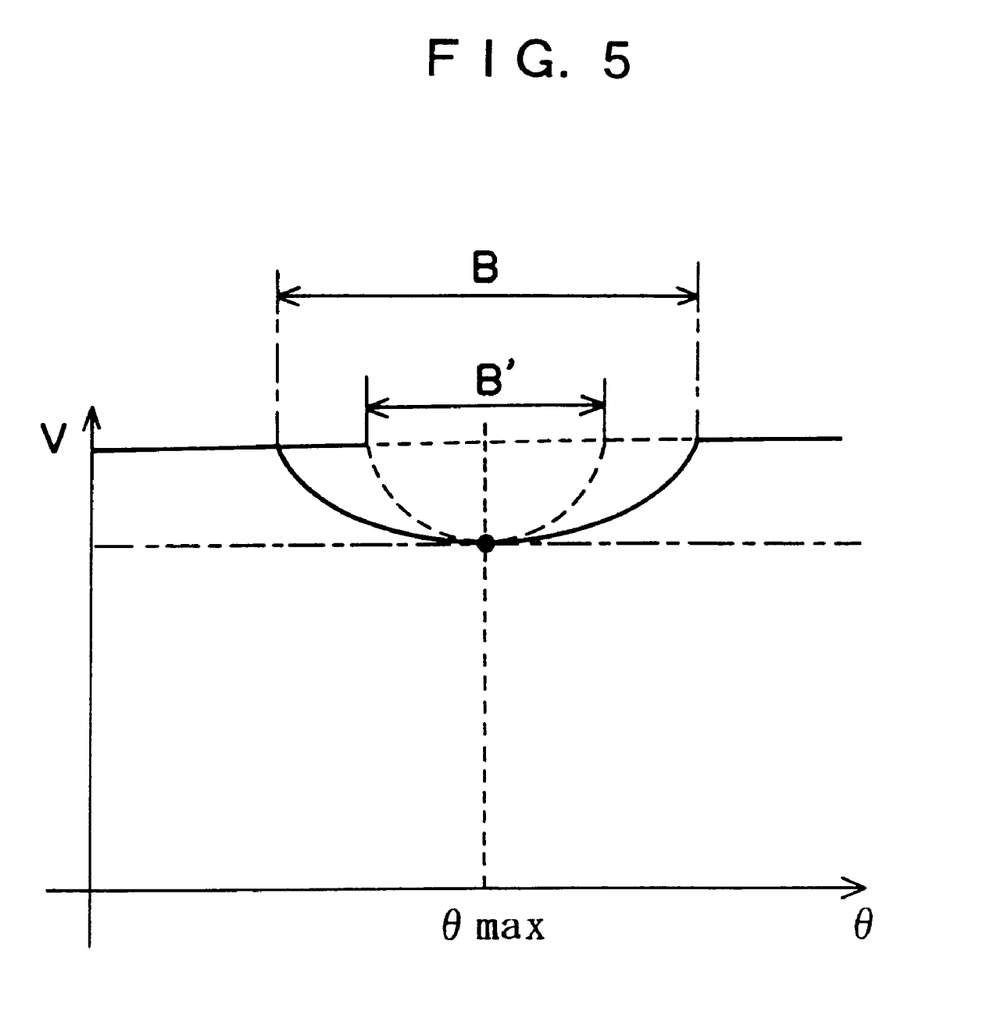
FIG. 5 is a graph for showing a function of the present invention.

As shown in FIG. 4(A) and (B), workpieces W and W' have edge surfaces having different inclinations relative to an axis of the stylus 102, in which the latitude position defining the contact location of the contact portion 102A with radius R is angular position β and β' (β<β') on a plane including an axis of the stylus 102.

In this state, when the scanning rotary motion of the stylus 102 is generated by the rotary motion generator, the contact portion 102A touches the edge surface of the workpiece W on a part of arc with a radius of R cos β in the case shown in FIG. 4(A) and touches the edge surface of the workpiece W' on a part of arc with a radius of R cos β' in the case shown in FIG. 4(B). Since R cos β is larger than R cos β' (R cos β>R cos β'), a phase section width B to which the contact force is applied at the angle β with a small latitude position of the contact location is larger than a phase section width B' to which the contact force is applied at the angle α' with a large latitude position of the contact location.

In other words, when a difference of the phase value θ max showing maximum change amount of the detection signal value V at the angle β and β' is obtained, the difference of the phase section width B and the phase section width B' can be detected by obtaining the contact force effect initiating point and the contact force effect terminating point of the contact portion 102A relative to the workpiece, thus obtaining the latitude position of the contact location of the contact portion 102A to the workpiece W from the difference between the phase section width B and the phase section width B'.

According to the above-described steps, the longitude position and the latitude position of the contact portion 102A can be obtained by the contact location detector based on detection status of the detector and the phase detector, so that the contact location of the contact portion 102A of the touch signal probe 100 can be detected.

The contact location detecting mechanism of a touch signal probe according to the present invention may preferably include a corrective signal generator for outputting a corrective signal for restricting a motion of the stylus support to a controller of the stylus support when the maximum change amount of the detection signal value exceeds a predetermined value and when the phase section width is narrower than a predetermined value.

According to the above arrangement, since the corrective signal generator is provided, motion such as suspension and retraction can be given to the stylus support in accordance with the maximum change amount of he detection signal value, thus preventing a damage on the touch signal probe on account of an excessive contact force.

In the present invention, the corrective signal by the corrective signal generator may preferably be a corrective vector signal in a normal direction of the sphere of the contact portion separating from the workpiece from a base point of the longitude position and the latitude position obtained by the contact location detector, and a magnitude of the corrective vector signal may preferably be defined so that the phase section width becomes a predetermined phase section width and the maximum change amount of the detection signal value comes within a predetermined range.

According to the above arrangement, since the corrective signal is the corrective vector signal, the contact of the contact portion of the stylus and the workpiece can be appropriately maintained even when the motion of the stylus support is restricted by the corrective signal, so that the measurement can be resumed consecutively, thereby being suitable for the continuous measurement and profiling measurement.

In the present invention, when the contact location detector detects a change of the detection signal value throughout the scanning rotary motion, the corrective signal generator preferably outputs a corrective signal for avoiding the change throughout the scanning rotary motion.

According to the above arrangement, since the corrective signal generator outputs the corrective signal for avoiding the change throughout the scanning rotary motion where the above phase section width cannot be detected, the contact location of the contact portion can be prevented from not being detected.

In the present invention, a cycle and amplitude of the scanning rotary motion by the rotary motion generator may preferably be independent from a motion of the vibrator.

According to the above arrangement, since the scanning rotary motion by the rotary motion generator is independent from the motion of the vibrator, the scanning rotary motion of the stylus is possible without being influenced by the vibration status of the stylus, so that the contact location of the contact portion can be securely obtained by the contact location detector.

DETAILED DESCRIPTION OF PREFERRED EMBODIMENT(S)

An embodiment of the present invention will be described below with reference to the drawings. The same or similar reference numerals will be attached to members identical with or similar to the above-described parts and members to omit or simplify description thereof.

Figure 6:
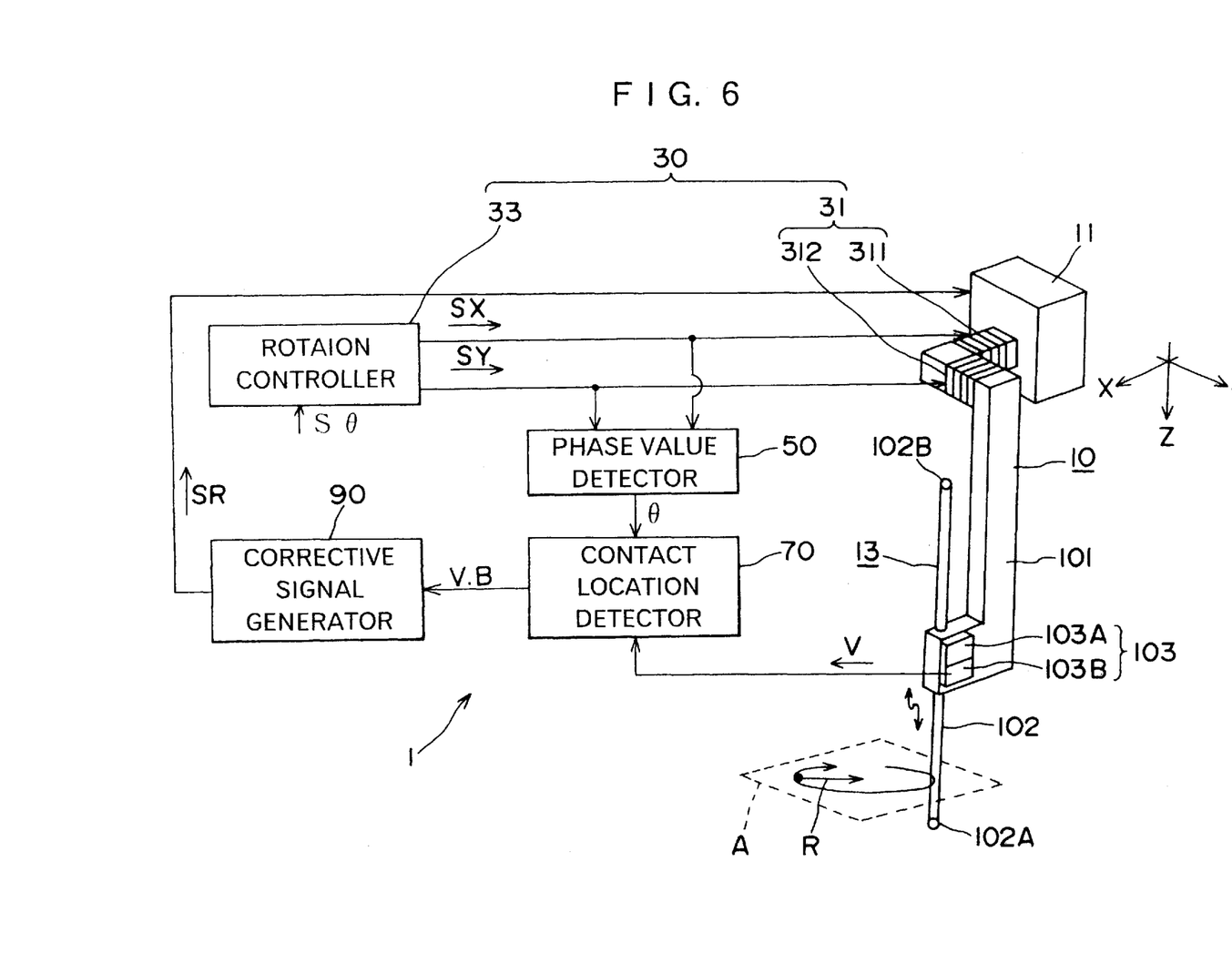
FIG. 6 is a schematic view for showing a contact location detecting mechanism of a touch signal probe according to an embodiment of the present invention.

FIG. 6 shows a contact location detecting mechanism of a touch signal probe according to the present embodiment. A contact location detecting mechanism 1 includes a touch signal probe 10, a rotary motion generator 30, a phase value detector 50, a contact location detector 70 and a corrective signal generator 90.

The touch signal probe 10 has approximately the same structure as the touch signal probe 100 described above with reference to FIG. 10, which includes a stylus support 11 for moving in a three-dimensional space at a predetermined velocity vector in accordance with a control command by a controller (not shown), a stylus holder 101 mechanically connected to the stylus support 11, and a probe body 13 having a stylus 102, a contact portion 102A, a vibrator 103A and a detector 103B.

The rotary motion generator 30 causes scanning rotary motion of the above stylus 102 on a plane A orthogonal with an axis of the stylus 102 at a predetermined radius R and a predetermined angular velocity. The rotary motion generator 30 includes a driving mechanism 31 disposed between the stylus support 11 and the stylus holder 101, and a rotation controller 33 for sending control signal to the driving mechanism 31.

The driving mechanism 31 has an X-axis driving section 311 and a Y-axis driving section 312 for moving the stylus 102 along an X-axis and Y-axis extending on the plane A being orthogonal with each other.

The rotation controller 33 generates an X-axis control signal SX=R cos θ and a Y-axis control signal SY=R sin θ according to an angle control signal Sθ and outputs the X-axis control signal SX to the X-axis driving section 311 and the Y-axis control signal SY to the Y-axis driving section 312. Since the angle control signal Sθ is given at a predetermined cycle, the X-axis driving section 311 and the Y-axis driving section 312 move by a predetermined cycle, thus causing scanning rotary motion of the stylus 102 on the plane A by the predetermined radius R and the predetermined angular velocity.

The phase value detector 50 detects a rotation position of the stylus 102 during the scanning rotary motion according to the X-axis control signal SX and the Y-axis control signal SY outputted by the rotation controller 33 and the cycle according to which the control signals SX and SY are outputted. The phase value detector 50 outputs the detected rotation position θ of the stylus 102 to the contact location detector 70.

The contact location detector 70 receives the detection signal value V detected by the detector 103B of the probe body 13 indicating a vibration status of the stylus 102, and calculates a longitude position and a latitude position of the contact portion 102A of the stylus 102 based on the detection signal value V and the rotation position θ of the stylus 102 sent from the phase value detector 50.

Further, the contact location detector 70 outputs change amounts of the detected detection signal value V and a phase section width B showing a range of rotation positions of the stylus 102 while the detection signal value V is varied, to the corrective signal generator 90.

The corrective signal generator 90 outputs a corrective signal SR to a controller (not shown) for controlling the stylus support 11 based on a detection signal value V and the phase section width B from the contact location detector 70. More specifically, the corrective signal generator 90 outputs the corrective signal SR to the controller when the change amount of the detection signal value V is larger than a predetermined value or when the phase section width B is smaller than a predetermined value.

Next, a profiling measurement of a workpiece by the contact location detecting mechanism 1 of the touch signal probe will be described below with reference to FIG. 7(A) and FIG. 7(B).

Figure 7A:
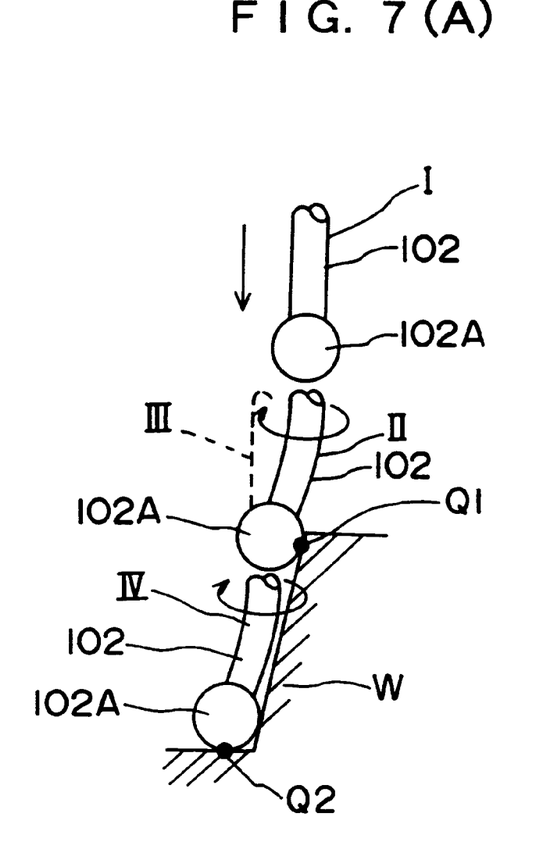
FIG. 7(A) and FIG. 7(B) are schematic views for showing measurement process by a contact location detecting mechanism according to the aforesaid embodiment.

(1) As shown in FIG. 7(A), when the stylus 102 descends from an upside direction of the workpiece W (status I) by the stylus support 11, the contact portion 102A touches the workpiece W at a point Q1 (status II).

(2) When the contact portion 102A touches the workpiece W at the point Q1, the scanning rotary motion of the stylus 102 is initiated by the rotary motion generator 30. The phase value detector 50 calculates the rotation position θ of the stylus 102 based on the X-axis control signal SX and the Y-axis control signal SY outputted by the rotation controller 33 and outputs the rotation position θ to the contact location detector 70.

Figure 8:
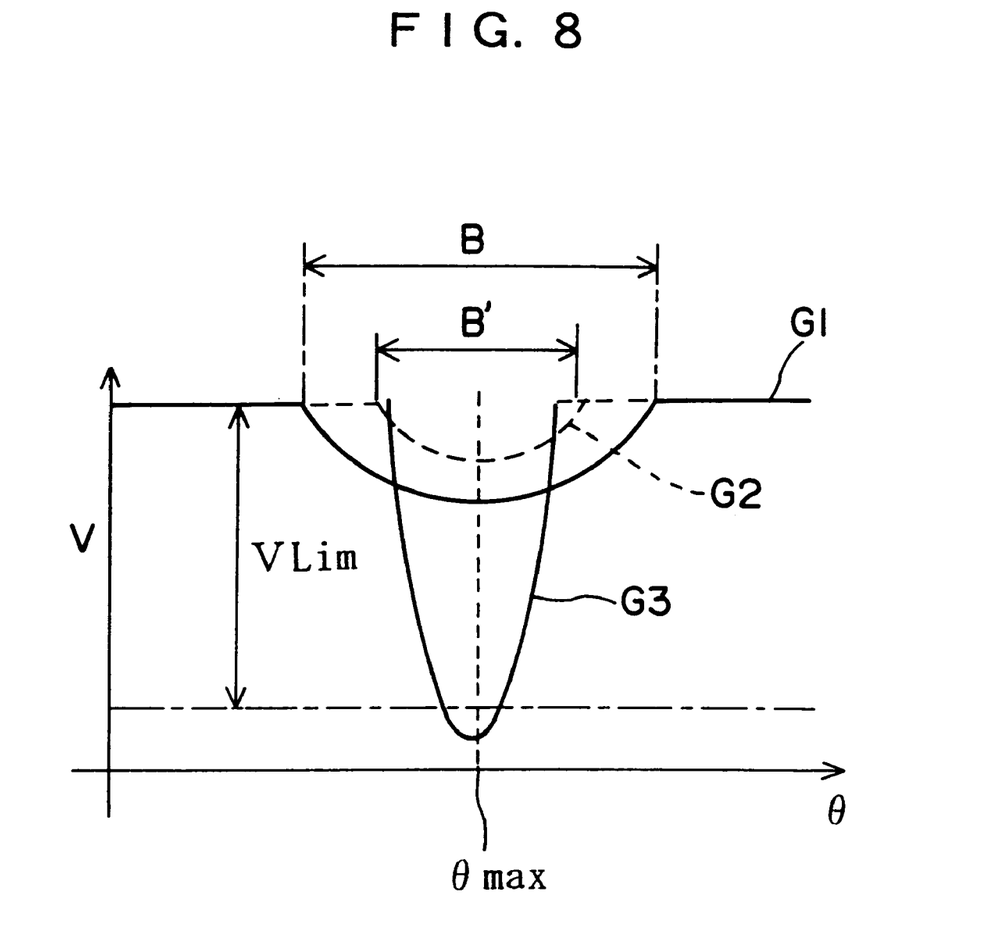
FIG. 8 is a graph for showing change and phase section width of a detection signal value obtained by measurement process by the contact location detecting mechanism of the aforesaid embodiment.

(3) As shown in G1 of FIG. 8, the contact location detector 70 obtains a phase value θ max indicating maximum change amount of the detection signal value V and the phase section width B as a range of θ when the detection signal value V is varied, and calculates the longitude position and the latitude position of the contact location of the contact portion 102A at the point Q1 based on the phase value θ max and the phase section width B.

(4) When the stylus 102 further descends, the detection signal value V and the phase section width B at the phase value θ max become larger. When these values exceed a predetermined value, the corrective signal generator 90 outputs the corrective signal SR based on the phase value θ max and the phase section width B to correct the movement of the stylus support 11.

Figure 7B:
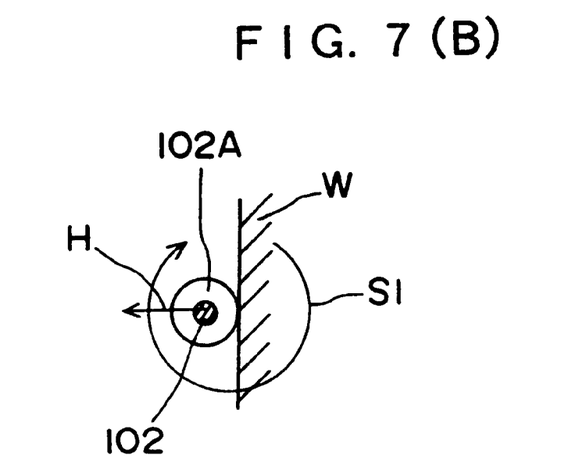

More specifically, the corrective signal SR is a corrective vector signal in a direction H of a normal direction of the sphere of the contact portion 102A separating away from the workpiece W from a base point of the longitude position and the latitude position of the contact location calculated by the contact location detector 70 (see FIG. 7(B)). The corrective signal SR decreases the contact force of the stylus 102 toward the workpiece W (status III). Preferably, the magnitude of the corrective vector signal of the corrective signal SR is defined so that the phase section width B is equal to the phase section width B' and the change amount of the detection signal value V at the phase value θ max comes within a predetermined range as shown in G2 of FIG. 8, thus applying the contact force always at a part of the orbit S1 of the scanning rotary motion.

(5) When the stylus 102 further descends while repeating above movement correction of the stylus support 11 and the contact portion 102A touches at a point Q2 as a location orthogonal with the axial direction of the stylus 102, the change amount of the detection signal value V exceeds the maximum change amount Vlim as shown in G3 of FIG. 8. In this case, the corrective signal generator 90 outputs a corrective signal SR for suspending the measurement, and the stylus support 11 raises the stylus 102 based on the corrective signal SR.

Figure 9A:
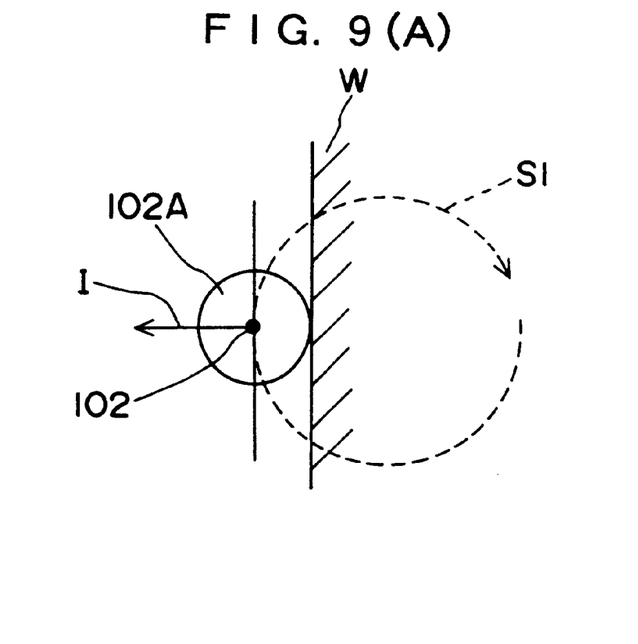
FIG. 9(A) and FIG. 9(B) are a schematic view and a graph for showing a condition where the detection signal is varied throughout a scanning rotary motion of the aforesaid embodiment.
Figure 9B:
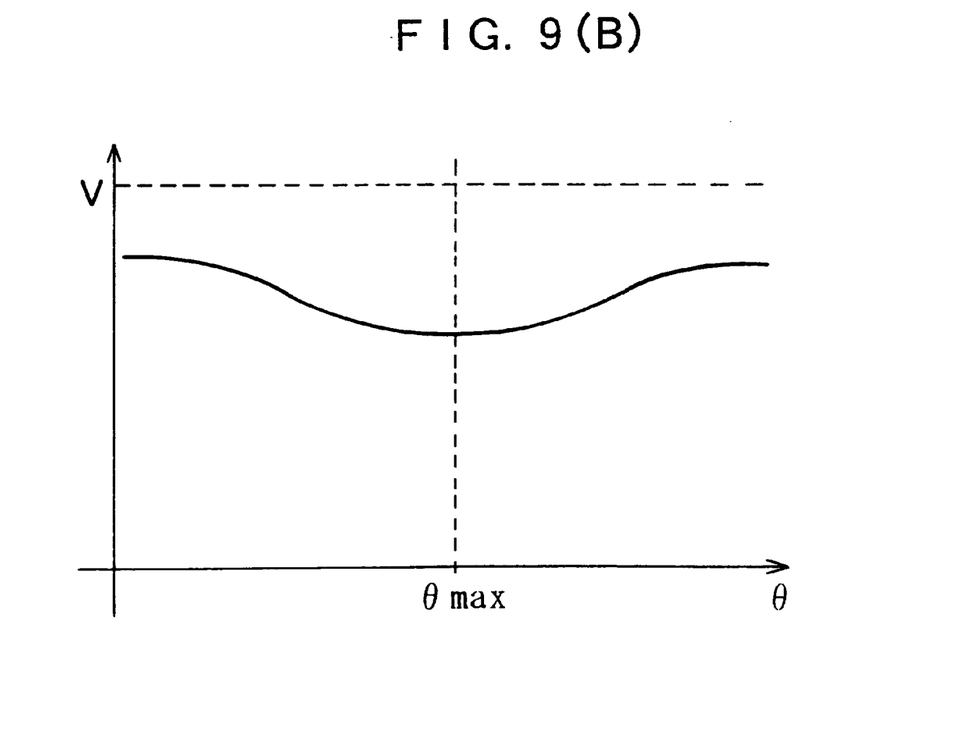

(6) Further, as shown in FIG. 9(A) and FIG. 9(B), when the corrective signal generator 90 detects change of the detection signal value V throughout the scanning rotary motion, i.e. over 360 degrees of the phase section width, since the contact location detector 70 is unable to detect the phase section width B, the corrective signal generator 90 outputs the corrective signal SR to avoid the change of the detection signal value V throughout the scanning rotary motion. As shown in FIG. 9(A), the corrective signal SR is a corrective vector signal in the direction I to separate the stylus 102 from the contact location of the workpiece W.

According to the above-described embodiment, following effects can be obtained.

Since the rotary motion generator 30, the phase value detector 50, and the contact location detector 70 are provided, the contact location of the contact portion 102A toward the workpiece W can be detected by the contact location detector 70 according to the detection signal value V by the detector 103B of the scanning rotary motion and the rotation position θ by the phase value detector 50. Therefore, the contact location detecting mechanism 1 enables profiling measurement and the continuous measurement of the workpiece W using the touch signal probe 10. Further, the movement of the stylus support 11 can be corrected based on the detected contact location, thus conducting measurement at an appropriate status.

Further, since the contact location is given as the longitude position and the latitude position of the spherical contact portion 102A, the corrective signal SR can be obtained only by obtaining the part where the change amount of the detection signal value V is the largest and the range of the rotation position θ within which the detection signal value V varies, thus facilitating handling of the signal of the contact location detector 70 and the corrective signal generator 90.

Further, since the corrective signal generator 90 outputs the corrective signal SR for restricting the movement of the stylus support 11, the stylus support 11 can be suspended or retracted according to the maximum change amount of the detection signal value V, thus preventing damage to the touch signal probe 10 by an excessive contact force.

Since the corrective signal SR is the corrective vector signal in a direction separating from the detected contact location Q1 and the magnitude thereof has the predetermined phase section width B', the contact between the contact portion 102A of the stylus 102 and the workpiece W can be appropriately maintained for continuing the measurement even when the movement of the stylus support 11 is restricted, so that the touch signal probe 10 can be used for the profiling measurement for detecting the configuration of the workpiece W.

Further, since the cycle and amplitude of the scanning rotary motion by the rotary motion generator 30 is independent from the movement of the vibrator 103A, the scanning rotary motion of the stylus 102 is possible without being influenced by the vibration status of the stylus 102, thus securely obtaining the contact location of the contact portion 102A by the contact location detector 70.

The scope of the present invention is not limited to the above-described embodiment, but includes following modifications and the like.

In the aforesaid embodiment, though the driving mechanism 31 of the rotary motion generator 30 includes the X-axis driving section 311 and the Y-axis driving section 312 and the rotation controller 33 outputs the control signals SX and SY to the respective driving sections 311 and 312, other arrangement is possible. Specifically, a driving mechanism moving in accordance with the rotation angle θ and the rotation radius R can also be preferably used. In other words, a driving mechanism having the other structure can be used as long as the scanning rotary motion of the stylus is possible.

Further, though the scanning rotary motion starts after the contact portion 102A touches the workpiece W, but the contact portion may touch the workpiece while conducting the scanning rotary motion of the stylus in advance.

Other specific arrangement and configuration for implementing the present invention may be used as long as an object of the present invention can be achieved.

In the present invention, the phase value detector 50, the contact location detector 70, the corrective signal generator 90 can be implemented with the use of an existing electric circuit. The vibrator 103A and the detector 103B may be implemented using an existing mechanical arrangement. These respective portions may be arranged in other form so that respective functions can be achieved based on an existing mechanical technique, electric circuit technique and computer technique. These respective portions may be arranged by a sheer hardware, a computer software, and combination thereof.

What is claimed is:

1. A contact location detecting mechanism of a touch signal probe, the touch signal probe having a stylus support for moving in a three-dimensional space by a predetermined velocity vector according to an external command, a stylus holder mechanically connected to the stylus support, a stylus supported by the stylus holder and including a contact portion to be touched to a workpiece at a pointed end thereof, a vibrator provided to a part of the stylus holder for resonantly vibrating the stylus in an axial direction thereof, and a detector provided to a part of the stylus holder for detecting a change in vibration by the vibrator, the touch signal probe detecting the change in vibration by the detector when the contact portion touches the workpiece, the contact detecting mechanism of a touch signal probe detecting the contact location on the contact portion to the workpiece, comprising:

a rotary motion generator for making a scanning rotary motion of the stylus on a plane orthogonal with an axis of the stylus by a predetermined radius and a predetermined angular velocity;

a phase value detector for detecting phase value indicating a rotation position of the scanning rotary motion by the rotary motion generator; and a contact location detector for detecting the contact location of the contact portion to the workpiece based on a detection signal value detected by the detector and the phase value detected by the phase value detector while the contact portion touches the workpiece.

2. The contact location detecting mechanism of a touch signal probe according to claim 1, wherein the contact portion has a spherical surface;

wherein the contact location is defined as a point on the spherical surface and is given by a longitude position defined as an angular position on the plane orthogonal with the axis of the stylus and a latitude position defined as an angular position on a plane including the axis of the stylus; and wherein the contact location detector obtains the longitude position from the phase value at which a change of the detection signal value is maximum while the contact portion touches the workpiece during the scanning rotary motion, and obtains the latitude position from the phase value having the maximum change of the detection signal value and a phase section width indicating a section of the phase value within which the detection signal value varies by the contact.

3. The contact location detecting mechanism of a touch signal probe according to claim 2, further comprising a corrective signal generator for outputting a corrective signal for restricting a motion of the stylus support to a controller of the stylus support when the maximum change amount of the detection signal value exceeds a predetermined value and when the phase section width is narrower than a predetermined value.

4. The contact location detecting mechanism of a touch signal probe according to claim 3, wherein the corrective signal by the corrective signal generator is a corrective vector signal in a normal direction of the sphere of the contact portion separating from the workpiece from a base point of the longitude position and the latitude position obtained by the contact location detector, and wherein a magnitude of the corrective vector signal is defined so that the phase section width becomes a predetermined phase section width and the maximum change amount of the detection signal value comes within a predetermined range.

5. The contact location detecting mechanism of a touch signal probe according to claims 3 or 4, wherein, when the contact location detector detects a change of the detection signal value throughout the scanning rotary motion, the corrective signal generator outputs a corrective signal for avoiding the change throughout the scanning rotary motion.

6. The contact location detecting mechanism according to any one of claims 1 to 4, wherein a cycle and an amplitude of the scanning rotary motion by the rotary motion generator is independent from a motion of the vibrator.

7. The contact location detecting mechanism according to claim 5, wherein a cycle and an amplitude of the scanning rotary motion by the rotary motion generator is independent from a motion of the vibrator.

* * * * *